US008291314B2

(12) United States Patent
Atkins

(10) Patent No.: US 8,291,314 B2
(45) Date of Patent: Oct. 16, 2012

(54) ARRANGING GRAPHIC OBJECTS ON A PAGE

(75) Inventor: Clayton Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 393 days.

(21) Appl. No.: 12/606,922

(22) Filed: Oct. 27, 2009

(65) Prior Publication Data

US 2010/0269037 A1 Oct. 21, 2010

Related U.S. Application Data

(63) Continuation-in-part of application No. 12/428,599, filed on Apr. 23, 2009, now Pat. No. 8,161,384.

(51) Int. Cl.
*G06F 3/00* (2006.01)

(52) U.S. Cl. ........ 715/244; 715/234; 715/760; 715/852; 715/848

(58) Field of Classification Search .......... 715/200–205, 715/207–210, 226–229, 231–234, 237, 238, 715/243, 244, 248, 255, 256, 273, 760, 762, 715/763, 246, 700, 713, 781, 782, 848, 852, 715/853
See application file for complete search history.

(56) References Cited

U.S. PATENT DOCUMENTS 5,136,686 A 8/1992 Koza et al.
5,499,366 A 3/1996 Rosenberg et al.
5,555,362 A 9/1996 Yamashita et al.
5,712,995 A 1/1998 Cohn
5,729,254 A 3/1998 Marks et al.
5,760,786 A 6/1998 Marks et al.
5,889,523 A * 3/1999 Wilcox et al. ................ 715/854
5,920,315 A 7/1999 Santos-Gomez
5,956,738 A 9/1999 Shirakawa
6,005,560 A 12/1999 Gill
6,008,809 A 12/1999 Brooks
6,081,262 A 6/2000 Gill
6,111,586 A 8/2000 Ikeda
6,121,970 A 9/2000 Guedalia
6,301,586 B1 10/2001 Yang et al.
6,380,954 B1 4/2002 Gunther
6,415,306 B2 7/2002 Seaman
6,448,956 B1 9/2002 Berman et al.
6,563,602 B1 5/2003 Uratani et al.
6,596,032 B2 7/2003 Nojima
(Continued)

OTHER PUBLICATIONS

Joe Geigel, et al.; "Automatic page layout using genetic algorithms for electronic albuming"; Proceedings of Electronic Imaging 2001 (Jan. 2001).

(Continued)

*Primary Examiner* — Maikhanh Nguyen

(57) ABSTRACT

A method performed by a physical computing system for arranging a plurality of graphic objects on a page includes receiving the plurality of graphic objects in the physical computing system, the plurality of graphic objects including a number of variable graphic objects and a number of fixed graphic objects. The method further includes, for each of the fixed graphic objects, creating a number of discrete dimension sets, generating a number of binary trees, each of the binary trees representing a unique layout for the plurality of graphic objects in which each of the fixed graphic object exhibits one of the discrete dimension sets, assigning a score to each of the binary trees, and arranging the graphic objects according to the layout represented by a binary tree selected from the number of generated binary trees based on the score.

20 Claims, 11 Drawing Sheets

U.S. PATENT DOCUMENTS

| | | | | |
|---|---|---|---|---|
| 6,636,648 | B2 | 10/2003 | Loui et al. | |
| 6,636,650 | B1 | 10/2003 | Long et al. | |
| 6,701,306 | B1 * | 3/2004 | Kronmiller et al. | 707/797 |
| 6,727,909 | B1 | 4/2004 | Matsumura | |
| 6,771,292 | B2 | 8/2004 | Sharp | |
| 6,771,801 | B1 | 8/2004 | Fisher et al. | |
| 6,977,665 | B2 | 12/2005 | Yokouchi | |
| 7,013,432 | B2 | 3/2006 | Taylor et al. | |
| 7,019,864 | B2 | 3/2006 | Delhoune et al. | |
| 7,093,263 | B1 | 8/2006 | Sexton et al. | |
| 7,096,445 | B1 | 8/2006 | Pucci et al. | |
| 7,124,360 | B1 | 10/2006 | Drenttel et al. | |
| 7,145,674 | B2 | 12/2006 | Hayes | |
| 7,148,990 | B2 | 12/2006 | Atkins et al. | |
| 7,149,968 | B1 | 12/2006 | Ackerschewski et al. | |
| 7,184,167 | B1 | 2/2007 | Ito | |
| 7,207,735 | B2 | 4/2007 | Narusawa | |
| 7,281,199 | B1 | 10/2007 | Nicol et al. | |
| 7,340,676 | B2 * | 3/2008 | Geigel et al. | 715/853 |
| 7,640,516 | B2 * | 12/2009 | Atkins | 715/853 |
| 7,644,356 | B2 * | 1/2010 | Atkins et al. | 715/243 |
| 8,065,627 | B2 * | 11/2011 | Atkins | 715/788 |
| 2001/0033296 | A1 | 10/2001 | Fullerton et al. | |
| 2002/0051208 | A1 | 5/2002 | Venable | |
| 2002/0059322 | A1 | 5/2002 | Miyazaki | |
| 2002/0070982 | A1 | 6/2002 | Hill et al. | |
| 2002/0122067 | A1 | 9/2002 | Geigel et al. | |
| 2003/0001879 | A1 | 1/2003 | Lin et al. | |
| 2005/0071781 | A1 | 3/2005 | Atkins | |
| 2005/0071783 | A1 | 3/2005 | Atkins | |
| 2005/0138570 | A1 | 6/2005 | Good et al. | |
| 2005/0240865 | A1 | 10/2005 | Atkins et al. | |
| 2006/0103667 | A1 | 5/2006 | Amit et al. | |
| 2006/0150092 | A1 * | 7/2006 | Atkins | 715/517 |
| 2006/0200758 | A1 | 9/2006 | Atkins | |
| 2006/0279566 | A1 * | 12/2006 | Atkins et al. | 345/418 |
| 2009/0002764 | A1 * | 1/2009 | Atkins et al. | 358/1.18 |
| 2009/0089660 | A1 * | 4/2009 | Atkins et al. | 715/243 |

OTHER PUBLICATIONS

Eldan Goldenberg, "Automatic layout of variable-content print data", MCs Dissertation, School of Cognitive & Computing Sciences, University of Sussex, Brighton, UK (2002).

D.F. Wong, et al.; "A new algorithm for floorplan design"; Proc. Design Automation Conference; pp. 101-107, 1986.

C. Brian Atkins; "Adaptive Photo Collection Page Layout"; HP Labs; Palo Alto, CA 94304; 2004 Inti Conference, Oct. 24, 2004; <http://www.hpl.hp.com/researchlisl/layout>.

Jun Xiao, et al.; "Mixed-Initiative Photo Collage Authoring"; ACMMM 2008; Vancouver, BC, Canada; Oct. 27-31, 2008.

Joe Geigel, et al.; "Using Genetic Algorithms for Album Page Layouts"; Multimedia; IEEE, vol. 10, Issue: 4, pp. 16-27, (Oct.-Dec. 2003).

Andreas Girgensohn, et al.; "Stained Glass Photo Collages"; UIST '04; Oct. 24-27, 2004; Santa Fe, New Mexico, USA.

C. Brian Atkins; "Blocked Recursive Image Composition"; MM'08; Oct. 26-31, 2008; Vancouver, British Columbia, Canada.

Carsten Rother, et al.; "AutoCollage"; ACM Transactions on Graphics (TOG); vol. 25; Issue 3 (Jul. 2006).

* cited by examiner

Initial Layout Table (606)

608, 610, 612

| Object | Height | Width |
|---|---|---|
| 1 | H1 | W1 |
| 2 | H2 | W2 |
| 3 | H3 | W3 |
| 4 | H4 | W4 |
| 5 | H5 | W5 |
| 6 | H6 | W6 |
| 7 | H7 | W7 |

Dimension Table (900)

| 902 | 904 | 906 | 908 | 910 | 912 | 914 | 916 | 918 |
|---|---|---|---|---|---|---|---|---|
| Node | Vpath | Spacing | Variable | Fixed | Hpath | Spacing | Variable | Fixed |
| A | | | | | | | | |
| B | | | | | | | | |
| C | | | | | | | | |
| D | | | | | | | | |
| E | | | | | | | | |
| F | | | | | | | | |
| 1 | 1 | 2b | 0 | Hn + 2b | 1 | 2b | 0 | Wn + 2b |
| 2 | 2 | 2b | Hi | 2b | 2 | 2b | Wi | 2b |
| 3 | 3 | 2b | Hi | 2b | 3 | 2b | Wi | 2b |
| 4 | 4 | 2b | 0 | Hn + 2b | 4 | 2b | 0 | Wn + 2b |
| 5 | 5 | 2b | Hi | 2b | 5 | 2b | Wi | 2b |
| 6 | 6 | 2b | Hi | 2b | 6 | 2b | Wi | 2b |
| 7 | 7 | 2b | 0 | Hn + 2b | 7 | 2b | 0 | Wn + 2b |

*Fig. 9*

ARRANGING GRAPHIC OBJECTS ON A PAGE

CROSS-REFERENCE TO RELATED APPLICATIONS

Pursuant to 37 C.F.R. §1.53(b), the present application is a continuation-in-part of U.S. patent application Ser. No. 12/428,599 filed on Apr. 23, 2009 now U.S. Pat. No. 8,161,384 by Clayton Brian Atkins et al., which is incorporated herein by reference in its entirety.

BACKGROUND

Individuals and organizations are rapidly accumulating large collections of digital content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations increasingly will require systems and methods for organizing and presenting the digital content in their collections. To meet this need, a variety of different systems and methods for organizing and presenting digital content have been proposed.

For example, there are several digital albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital albuming systems to be tedious and time consuming.

In addition, several digital content composition systems enable users to create mixed content pages. A "mixed content page" is one having a mixture of image content objects and text blocks. Text blocks may take the form of captions associated with various images or be intended to stand alone. In addition to the image editing tools mentioned above, these systems provide tools that allow the user to customize text attributes including text point size, line spacing, bolding, and italicizing. These text attributes can have a significant impact on the overall size and shape of a rendered text block, which in turn can affect the sizing and placement of other graphic objects on a page. Again, users typically find the process of generating a mixed content page using fully manual digital systems to be tedious and time consuming.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIG. 9 is a diagram of an illustrative constraint table maintaining a record of relevant spacing information for a graphic object layout, according to one embodiment of principles described herein.

Throughout the drawings, identical reference numbers designate similar, but not necessarily identical, elements.

DETAILED DESCRIPTION

Figure 1:
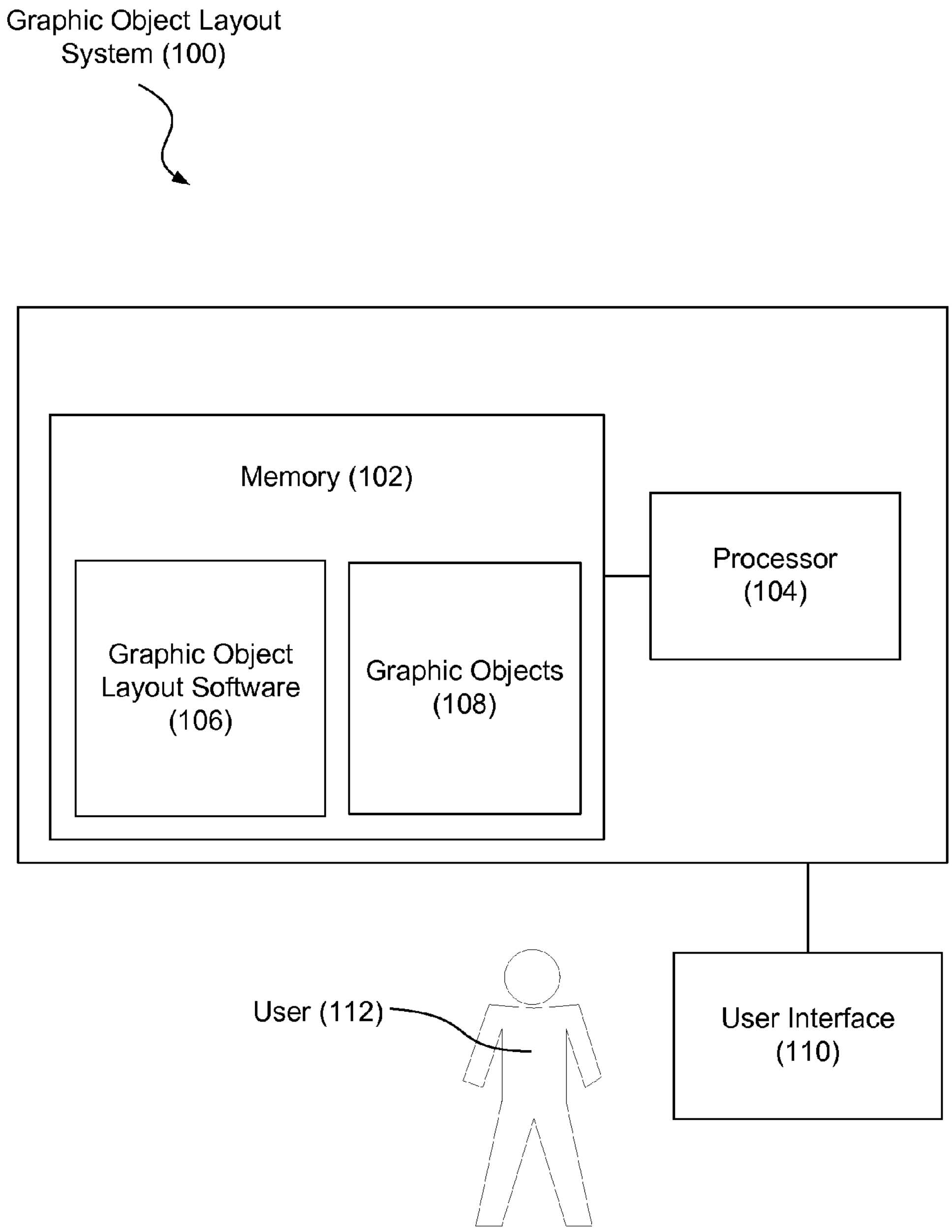
FIG. 1 is a diagram showing an illustrative graphic object layout system, according to one embodiment of principles described herein.

As described above, individuals and organizations are experiencing an increased demand for solutions to organize digital content. The process of manually laying out images and text blocks in an aesthetically pleasing manner can be difficult and time consuming. For example, a user may spend a significant amount of time adjusting the size and position of several graphic objects on a single page in order to find an aesthetically acceptable arrangement. The task of laying out graphic objects may become further complicated when some of the graphic objects are text blocks. Text blocks can often assume a variety of different formats which can affect the dimensions of the text block in different ways. When several text blocks are present in a layout, it can be very time consuming to experiment with different text block dimensions and positions.

Some graphic object layout software provides a user with a set of templates with which a user may place various graphic objects within predetermined locations across a predesigned page. Although templates may save a user some time, they often limit the number and location of graphic objects placed on the page. Additionally many templates limit the aspect ratio of a graphic object. The aspect ratio may be defined to be the height of a graphic object divided by the width of a graphic object. A user may need to crop a graphic object in order to make it fit a predefined location on a page.

The present specification relates to a method and system for determining a layout for a number of graphic objects that includes both graphic objects with fixed dimensions and graphic objects with fixed aspect ratios but variable areas. A system or method embodying principles described herein may work with a set of graphic objects, any number of which may have fixed dimensions. According to one illustrative embodiment, for each of the graphic objects with fixed dimensions to be put in the layout, a discrete number of nominal dimension sets are created. This number of nominal dimension sets may give the process described herein some flexibility by providing a range of aspect ratios for the graphic objects with fixed dimensions. Using different combinations of the dimension sets created for each fixed graphic object, several binary trees are generated, each binary tree representing a layout of graphic objects. Each fixed graphic object in each binary tree is associated with a fixed dimension set from the discrete nominal dimension sets created. Each binary tree is scored according to at least one predetermined criterion. The scoring process may involve the adjustment of the sizes of each graphic object represented by the binary tree to an optimal size according to an aspect ratio constrained graphic object sizing process. After this process has occurred, the graphic objects with both fixed sizes and variable sizes may be assigned final dimensions. The binary tree with the highest score may be selected for the final layout. The graphic objects may then be arranged on a page according to the layout determined by the binary tree with the highest scores. The page may then be presented to a user.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "graphic layout system" is to be broadly interpreted as a computing system capable of arranging graphic objects on a page and displaying an arrangement of the graphic objects to a user.

Throughout this specification and in the appended claims, the term "graphic object" is to be broadly interpreted as an image that can be selectively arranged on a page using graphic layout software. A "graphic object" as defined herein may include, but is not limited to, a photographic image, a non-photographic image, and a block of text. The term "variable graphic object" is to be broadly interpreted as a graphic object which has permission to adjust its size while maintaining its aspect ratio. The term "fixed graphic object" is to be broadly interpreted as a graphic object intended to have fixed dimensions, and thus a fixed area, though in some embodiments, the fixed dimensions may be allowed to vary within a predetermined range.

Throughout this specification and in the appended claims, the term "bounding box" is to be broadly interpreted as the minimum sized box into which a particular graphic object or set of graphic objects fits. The term "principal bounding box" refers to box of the minimum area into which all graphic objects of a particular layout fit.

Throughout this specification and in the appended claims, the term "layout" is to be broadly interpreted as an arrangement of graphic objects on a page. The term "page" is to be broadly interpreted as a fixed area upon which a layout may be presented to a user. A page may refer to a physical medium or an electronic medium displayed to a user through a display device.

Throughout this specification and in the appended claims, the term "system of linear equations" is to be broadly interpreted as a set of n equations that are linear in n unknown variables. A system of linear equations may be solved through a variety of means well known in the art.

Throughout this specification and in the appended claims, the term "nominal" as applied to a dimension is to be broadly interpreted to mean the dimension value which has been originally assigned for a particular layout. Nominal dimensions may be given to each of the fixed graphic objects within a layout.

Referring now to the figures, FIG. 1 is a diagram showing an illustrative graphic object layout system (100). According to one illustrative embodiment, a graphic layout system may include a processor (104), a user interface (110), and a memory (102) having graphic object layout software (106) and a number of graphic objects (108) stored thereon.

The graphic layout system (100) may be embodied as several different types of computing devices including, but not limited to, a laptop computer, a desktop computer, or a Personal Digital Assistant (PDA). According to a number of frameworks well known in the art, the system may be distributed geographically. For example, the UI may be running on a client computer with the memory and processor running on a server computer. The graphic layout system (100) may include a form of memory (102) including, but not limited to, a magnetic disk drive, a solid state drive, and/or an optical disc drive.

The graphic layout software (106) stored by the memory (102) may be embodied as computer readable code configured to cause a processor (104) to execute various instructions related to the layout of graphic objects (108) on a page.

A graphic object (108) may be any type of image including, but not limited to, a photo, a text block, or a piece of artwork. A collection of graphic objects (108) may include images imported from another memory medium as well as images designed and/or created with the graphic layout system (100).

The user interface (110) may enable interaction between the graphic object layout system (100) and a user (112). The user interface (110) may include a display device as well as an input receiving device such as a keyboard or a mouse. Through the user interface (110), a user (112) is able to send commands to the graphic layout system (100). These commands may involve the layout of graphic objects (108). Information about graphic objects (108) and their layout may be presented to the user (112) through the display device.

The graphic layout software may implement a variety of algorithms for processing data regarding the layout of graphic objects. In certain such algorithms, the layout of graphic objects on a page may be represented by a binary tree.

Figure 2A:
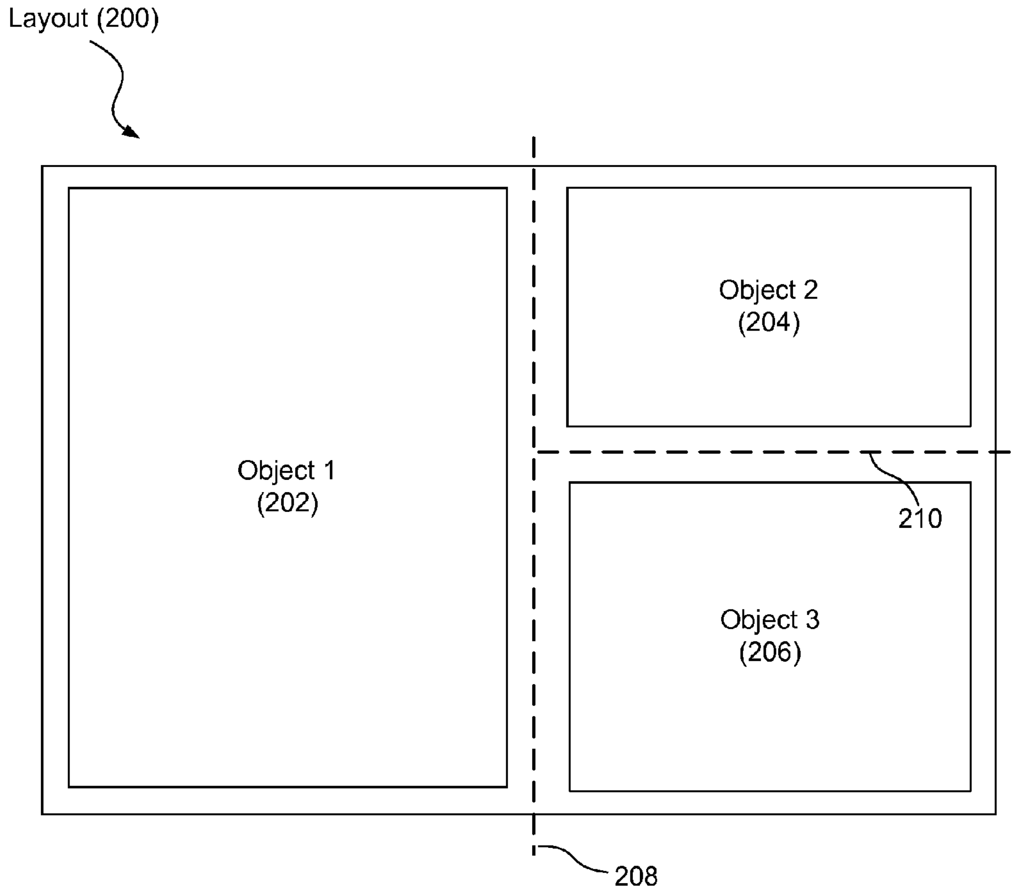
FIG. 2A is a diagram showing an illustrative layout of graphic objects on a page, according to one embodiment of principles described herein.
Figure 2B:
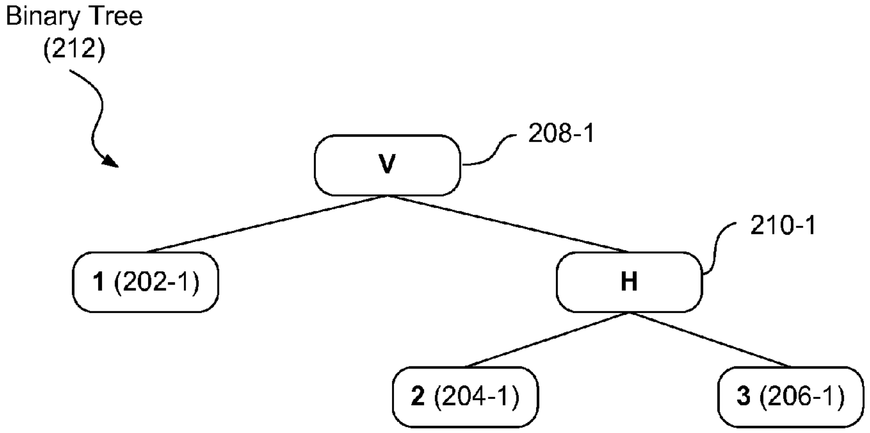
FIG. 2B is a diagram showing an illustrative binary tree used to represent the layout of the graphic objects shown in FIG. 2A, according to one embodiment of principles described herein.

FIG. 2A is a diagram showing an illustrative layout (200) of graphic objects on a page which may be represented as a binary tree. FIG. 2B is a diagram of an illustrative binary tree representing the layout shown in FIG. 2A. According to one illustrative embodiment, a set of graphic objects (202, 204, 206) may be distributed among partitions of a page defined by vertical (208) and horizontal (210) divisions.

A binary tree (212) is a data tree structure having multiple nodes arranged hierarchically such that each node contains either zero or two child nodes. When a binary tree represents a layout of graphic objects, the root node represents the first division of a page. A division may be either horizontal or vertical. In the case of FIG. 2, the first division is a vertical division (208). Thus the root node (208-1) represents the first vertical division (208).

Each child node represents the graphic objects on one side of a division. In one exemplary convention, in the case of a vertical division, the left child node represents the graphic object(s) on the left side of the division and the right child node represents the graphic object(s) on the right side of the division. In the case of FIG. 2, the left child node (202-1) of the root node (208-1) represents Object 1 (202) and the right child node (210-1) of the root node (208-1) represents Object 2 (204) and Object 3 (206).

A child node may represent a further division instead of a graphic object. In the case of FIG. 2, the right child node (210-1) of the root node (208-1) represents a horizontal division. Like a vertical division node, one child node of the division node represents the graphic object(s) on one side of the division and the other child node represents the graphic object(s) on the other side of the division. In the case of FIG. 2, the left child node (204-1) of the horizontal division node (210-1) represents Object 2 which is above the horizontal division (210) and the right child node (206-1) represents Object 3 (206) which is below the horizontal division (210).

Using the principles described above, a set of graphic objects may be placed into a variety of layouts, each layout represented by a binary tree. An initial height and width for each graphic object within a tree structure may be determined recursively, based at least in part on one or more constraints, such as the aspect ratios of the graphic objects and the required spacing between adjacent graphic objects. As used in the present specification and in the appended claims, the term "aspect ratio constrained graphic object sizing process" will refer broadly to any process by which a size is determined for each graphic object in a given layout such that graphic object aspect ratio constraints are respected. An example of one such aspect ratio constrained graphic object sizing process, in which a height and width are automatically assigned to each graphic object within a binary tree structure can be found in C. B. Atkins, "Blocked recursive image composition", in Proceedings of the $16^{th}$ ACM international Conference on Multimedia, Vancouver, British Columbia, Canada, Oct. 26-31, 2008. This is also the linear-system based area determination method of FIG. 7A, block 283 in the aforementioned U.S. patent application Ser. No. 12/425,599 ("the '599 application"), which has been incorporated herein by reference.

As mentioned above, it is often desirable to place text blocks within a layout of graphic objects. However, when a text block is adjusted to a height and width using an automated mechanism that lacks the ability to explicitly constrain the text block dimensions, the text may undesirably change size or take on an otherwise unattractive appearance in the final layout of a page. The applicant has discovered a method to find an optimal layout of graphic objects that may include any number of text blocks.

Figure 3:
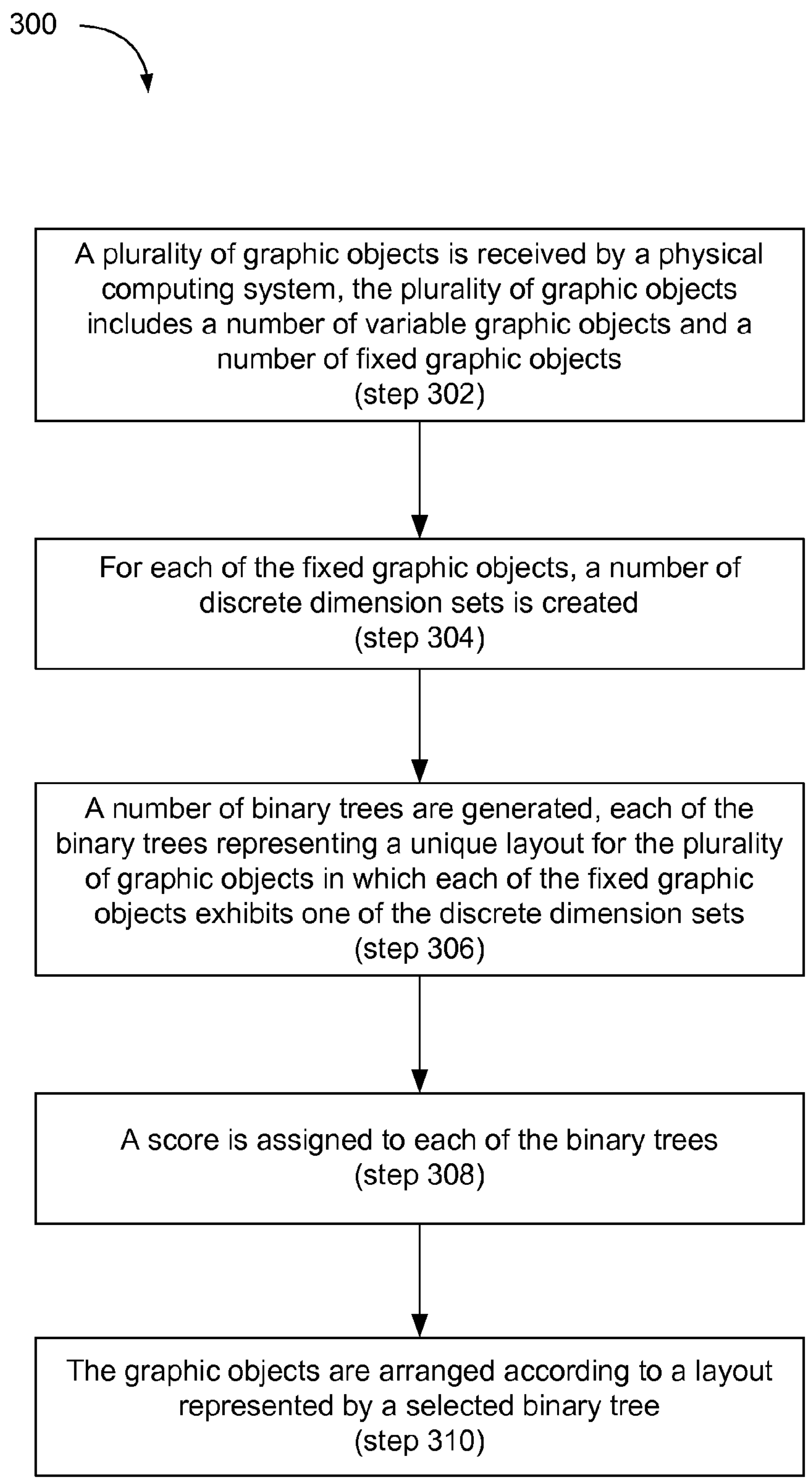
FIG. 3 is a flowchart depicting an illustrative method for arranging a mix of fixed and variable graphic objects on a page, according to one embodiment of principles described herein.

FIG. 3 is a flowchart depicting an illustrative method (400) for arranging a mix of fixed and variable graphic objects on a page. According to one illustrative embodiment, the method involves creating a set of candidate layouts. An appropriate layout from the set of layouts may then be selected. A variety of methods may be used to determine which layout may be the most appropriate.

To determine an optimal layout of graphic objects that include both text blocks and images, the computing system may receive (step 302) a number of graphic objects from a graphic object repository. This repository may reside in a memory medium which is either internal or external to the computing system. The exact graphic objects received by the computing system may be specified by a user. The photos or images may be designated as variable graphic objects while the text blocks may be designated as fixed graphic objects.

In one embodiment, the aspect ratios associated with variable graphic objects may generally remain constant. However, they may be modified to a certain extent if necessary. The aspect ratio of a graphic object may be modified by cropping or shrinking the graphic object in a manner that leaves the visible portion undistorted.

As mentioned above, a nominal dimension set may be assigned to a fixed graphic object. A nominal dimension set may refer to a specific number pair. For example, (H, W), in which H is a height value and W is a width value. In one embodiment, a nominal dimension set may be representative of a range of acceptable values. For example, the nominal dimension set might be (Hmin, Wmin) while the intervals [Hmin, Hmax] and [Wmin, Wmax] may characterize a range of acceptable (height, width) pairs. As used here, Hmin is a minimum acceptable height, Hmax is a maximum acceptable height, Wmin is a minimum acceptable width and Wmax is a maximum acceptable width. In the case of having a dimension set which includes a range of values, any dimension set that includes a height value above the minimum height but below the maximum height and a width value above the minimum width but below the maximum width may be acceptable.

A fixed graphic object may refer to a graphic object whose dimensions are to remain constant. Alternatively a fixed graphic object may refer to a graphic object whose dimensions are to remain within a predefined range. The computing system may be configured to determine a final layout in which the fixed graphic objects have acceptable nominal dimensions, or in which the fixed graphic objects have at least acceptable nominal dimensions; and the variable graphic objects have whatever dimensions are needed to satisfy requirements on spacing between adjacent objects, while either maintaining their aspect ratios, or modifying their aspect ratios to the smallest extent necessary.

A text block may be presented in a variety of dimension sets, each dimension set displaying the text differently. For example, a text block may have several small lines. In a further example, the same text block may contain a smaller number of lines, each line containing more text.

The computing system may be configured to create (step 304) a number of discrete dimension sets for each fixed object. Each dimension set is a single (height, width) pair that may also be an acceptable nominal dimension set. Throughout this specification nominal dimension may refer to one of the discrete dimensions assigned to a fixed graphic object. Each fixed object having different dimensions may present the text in a different manner. The exact number of dimension sets created (step 304) for each fixed graphic object may be determined by the computing system or a user. The smaller the number of the dimension sets for each fixed graphic object, the lighter the computing load will be for determining an optimal layout for all of the graphic objects.

After a number of dimension sets have been created (step 304) for each fixed graphic object, a set of candidate layouts may be generated (step 306). Each layout may be represented by a binary tree. Each binary tree will represent a unique layout of each of the graphic objects, including both fixed graphic objects and variable objects. Each fixed graphic object in a binary tree may have a dimension set from one of the discrete dimension sets created in the previous step. There may be binary trees that differ only in the used dimension set for a particular fixed graphic object. The set of binary trees may or may not be an exhaustive set of all possible layout configurations.

The computing system may be configured to assign (step 308) a score for each candidate binary tree. In order to determine a score, a nominal dimension set for each fixed graphic within the tree may need to be selected, and an optimal area for each variable graphic object within the tree may need to be determined. This process will be discussed in further detail below in correlation with FIG. 4.

After a score for each binary tree is assigned (step 308), the binary tree with the highest score may be presented to a user with the graphic objects arranged (step 310) as indicated by the binary tree. The user may then accept the layout or make changes to the layout. In response to a change made to the layout, the process of finding an optimal layout may repeat itself. For example, a user may wish to add or remove a graphic object from the layout, in which case the process of determining an optimal layout is repeated with the new set of graphic objects. In one embodiment, a user may cycle through the candidate layouts with higher scores and choose a layout from the layouts presented.

Figure 4:
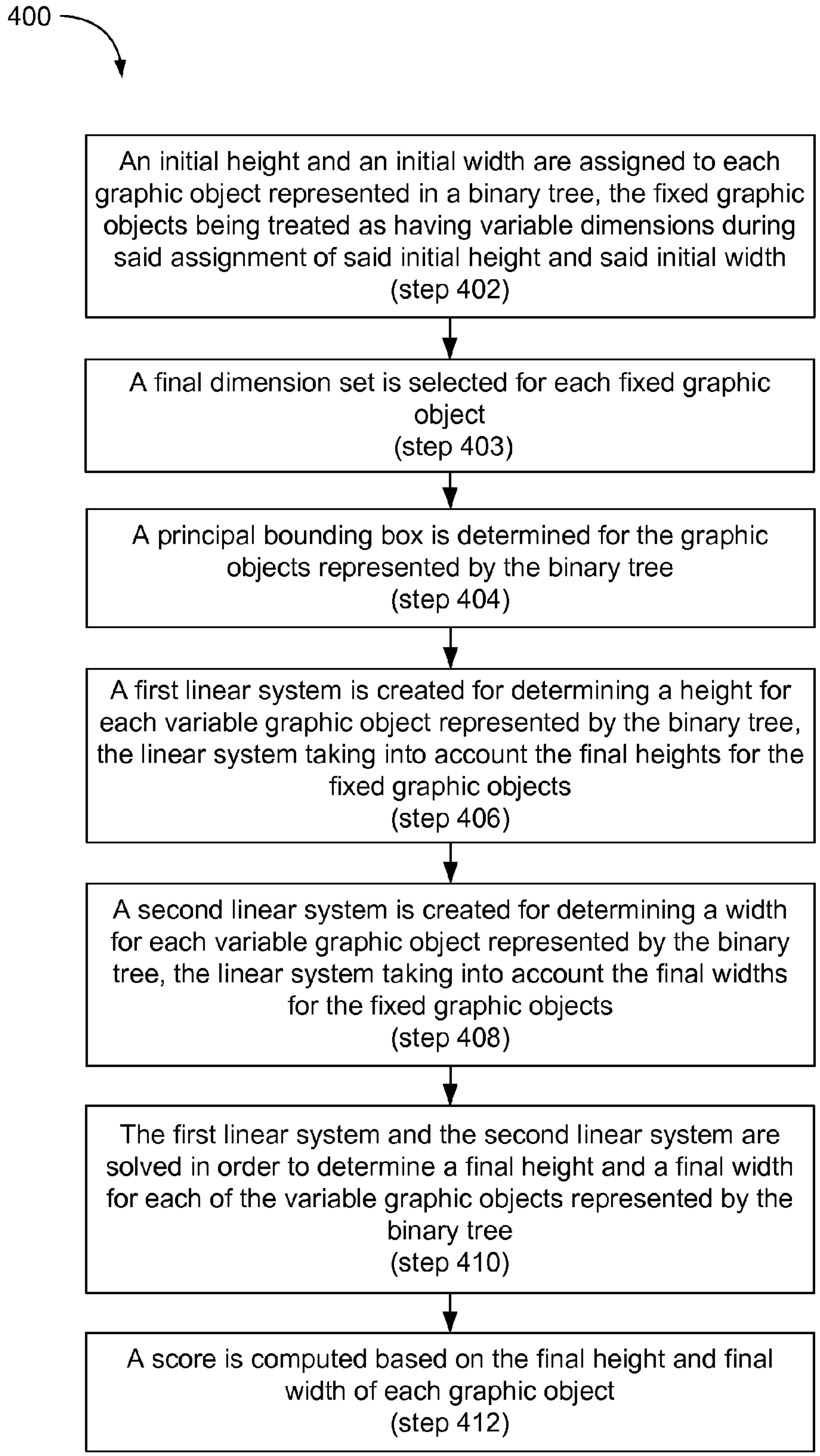
FIG. 4 is a flowchart depicting an illustrative method for scoring a binary tree, according to one embodiment of principles described herein.

FIG. 4 is a flowchart depicting an illustrative method (400) for scoring a graphic layout represented by a binary tree according to the above principles. According to one illustrative embodiment, the method involves determining a height and width for each graphic object within the layout. After graphic object heights and widths have been determined for a given candidate layout, a score may be given to that candidate layout. As described above with reference to FIG. 3, a score may be assigned to each of binary tree representing a unique layout for a plurality of graphic objects. Accordingly, the present method (400) may be performed for each binary tree generated for a plurality of graphic objects and a particular page size.

In order to determine a score, an initial dimension set for each graphic object within the layout may be assigned (step 402). These initial dimension sets can be determined using, for example, an aspect ratio constrained graphic object sizing process as described above. In certain embodiments, this type of process may be applied to the candidate binary tree with the assumption that each graphic object, including each fixed graphic object, be treated as if it has fixed aspect ratio but variable area. Doing so will generally produce a layout in which the initial dimensions of fixed graphic objects do not qualify as acceptable nominal dimensions. One advantage of this step is that it provides an initial height and an initial width for each of the variable graphic objects, which may simplify the process of determining final dimensions for all graphic objects in subsequent steps. In certain embodiments, the initial height and width for each graphic object in a particular layout may be maintained in a layout table.

For each fixed object a final dimension set is selected (step 403). This final dimension set may be the same as the nominal dimension set associated with the fixed object in the binary tree being scored. As mentioned above, the nominal dimension set may represent a range of nominal dimension set values. In this case, if an initial dimension of the fixed object from step 402 is an acceptable nominal dimension, the corresponding final dimension may be equal to the initial dimension; if an initial dimension of the fixed object from step 402 is outside an acceptable range, then the corresponding final dimension may be selected as the closest acceptable nominal dimension.

To determine final dimensions for each of the variable graphic objects within a layout such that the fixed graphic objects have the selected final dimensions, final dimensions for the principal bounding box for the final layout is determined (step 404). The principal bounding box is the outermost box which contains all graphic objects in the layout. This step will be described in greater detail below in correlation with FIG. 5.

To determine the final dimensions of each variable graphic object, two systems of linear equations may be created (step 406, step 408). One system of linear equations may be created (step 406) to determine the heights of each of the variable graphic objects and another system of linear equations may be created (step 408) to determine the widths of the variable graphic objects. As appreciated by those skilled in the relevant art, a system of linear equations includes a number of n equations with a number of n unknown variables. The unknown variables may be the heights or widths of the variable graphic objects.

A system of linear equations may take into account the final dimensions of fixed graphic objects, border thicknesses, and spacing distances. In general, the number of equations and unknown variables will be equal to the number of variable graphic objects within a given layout. A more detailed description of the process of determining constraints and constructing a system of linear equations will be discussed below in correlation with FIG. 10 and FIG. 11.

The two systems of linear equations may then be solved (step 410) to determine the final dimensions of each variable graphic object in the layout. Some of the equations in the system of linear equations may be designed so that upon solving, variable objects and fixed objects on one side of a division have a similar dimension to variable objects and fixed objects on the other side of a division. This may be the case if the variables represent the heights of the variable graphic objects, and the division in question is a vertical division; or if the variables represent the widths of the variable graphic objects, and the division in question is a horizontal division. Still, other equations in the system of linear equations may be designed so that upon solving, ratios of dimensions of variable graphic objects on either side of a division are preserved when compared to analogous ratios in the layout of initial graphic object dimensions. Such is the case if the variables represent the heights of the variable graphic objects and the division in question is a horizontal division, or if the variables represent the widths of the variable graphic objects and the division in question is a vertical division. An example of such a solution is discussed below in correlation with FIG. 8.

In certain embodiments, the height and width for each node of the binary tree representing the layout may be placed into a table. Various methods may be used to determine the dimensions for interior nodes. In addition, various constraints may be placed into the system of linear equations.

It may be the case that particular layouts are not compatible with all desired constraints, thereby rendering their corresponding systems of linear equations unsolvable. For example, the fixed objects may take up so much space in the layout that insufficient room remains for variable graphic objects no matter their constraints. If the systems of linear equations for a candidate layout are unsolvable, the binary tree representing that layout may be dropped from the set of binary trees.

After the final dimensions for each of the graphic objects within a particular candidate layout have been determined, a score may then be computed (step 412) to that layout. Any scoring method may be applied to the layout that may suit a particular application of the principles described herein. For example, layouts may be assigned a score on the basis of aesthetic criteria defined by a user. Thus, a scoring function may take into account a variety of factors including, but not limited to, how much unused space exists in the layout, how close the area of each graphic object is to any user preference, whether the layout exhibits symmetry or balance, and a variety of other factors. Additionally or alternatively, scoring may be based on printing expenses, digital file sizes, and/or any other applicable criteria.

As will be appreciated by one skilled in the relevant art, given the initial dimensions of the graphic objects, and the selected final dimensions of the fixed objects, several methods might be used to decide upon the final dimensions of the principal bounding box. For example, if the initial dimensions for fixed graphic objects are all smaller than their final dimensions, then final dimensions of the principal bounding box that are greater than the initial dimensions of the principal bounding box by some predetermined amount, in at least one of either height or width, can be decided upon. In a further example, if the initial dimensions for fixed graphic objects are all greater than their final dimensions, then final dimensions of the principal bounding box that are less than initial dimensions of the principal bounding box by some predetermined amount, in at least one of either height or width, can be decided upon. However, these examples do not address the situation where some initial dimensions for fixed graphic objects are smaller than, and those for others are greater than the corresponding final dimensions. In addition, they do not address the important aspect of how the fixed graphic objects are arranged in the layout.

Figure 5:
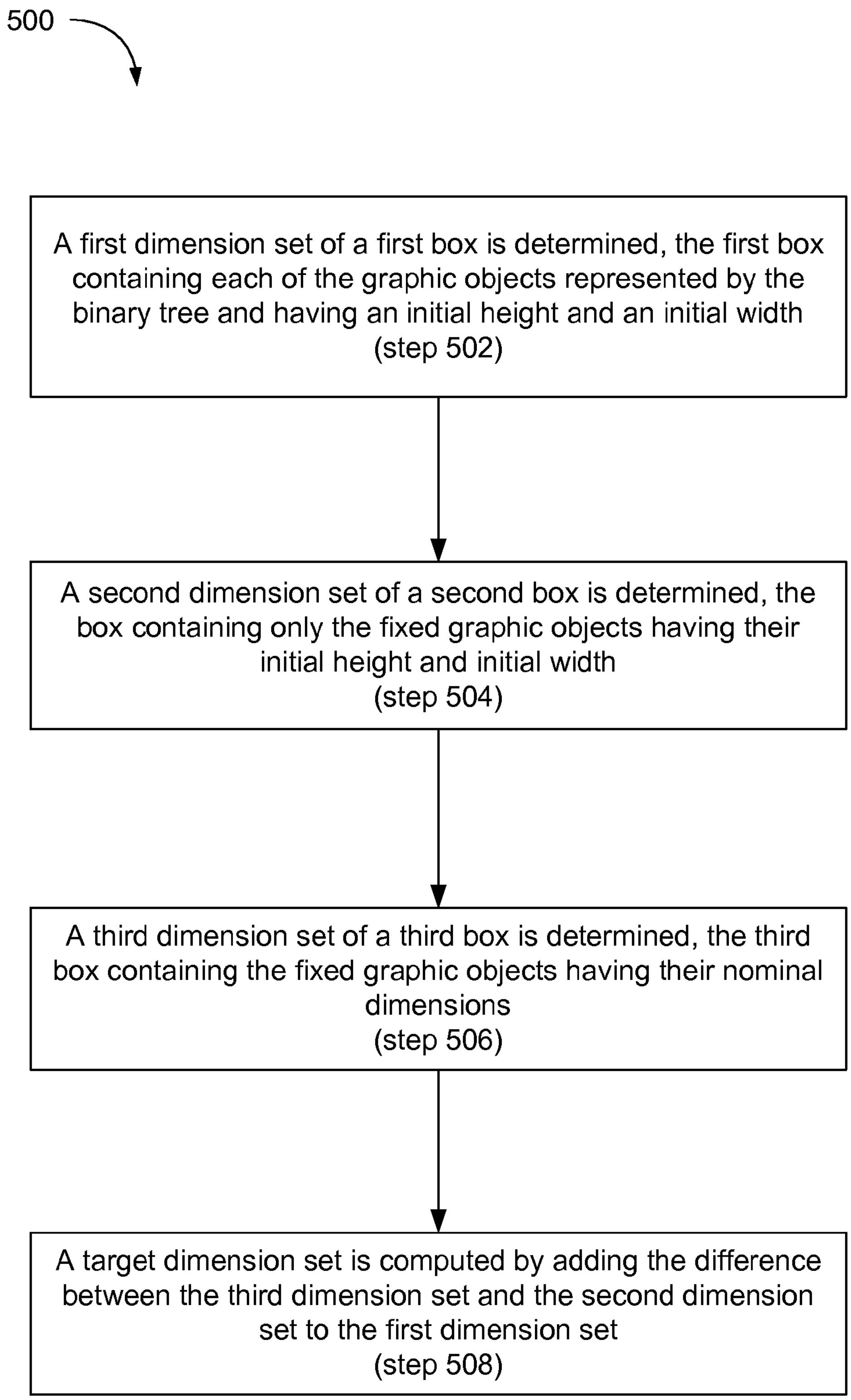
FIG. 5 is a flowchart depicting an illustrative method for determining the principal bounding box of a graphic object layout, according to one embodiment of principles described herein.

FIG. 5 is a flowchart depicting an illustrative method (500) for determining final dimensions for the principal bounding box of a graphic object layout. The illustrative embodiment described here takes into account not only any combination of differences between initial and final dimensions of fixed area graphic objects, but also spatial relationships among the positions of fixed area graphic objects. The method involves finding the difference between the initial dimensions of the fixed graphic objects determined by an aspect ratio constrained graphic object sizing process and their final dimensions. The differences in dimensions may then be applied to the principal bounding box initially determined by the aspect ratio constrained graphic object sizing process.

In the illustrative embodiment, the first box is the outermost box containing each of the graphic objects as determined (step 502) by an aspect ratio constrained graphic object sizing process when assuming that all the graphic objects have variable dimensions. The height and width of this first box may be determined (step 502) and recorded.

The second box is the outermost box of a temporary layout containing only the fixed graphic objects with their initial dimensions assigned by the aspect ratio constrained graphic object sizing process. Between each of the fixed graphic objects, the spacing and border requirements for variable objects within the layout may still be present. However, in determining the second box, the area of each of the variable graphic objects may be temporarily set to zero. The height and width of this second box may then be determined (step 504) and recorded.

The third box is similar to the second box. The difference is that the fixed graphic objects assume their final dimensions instead of the initial dimensions assigned by the aspect ratio constrained graphic object sizing process. The height and width of the third box may then be determined (step 506) and recorded.

Figure 7:
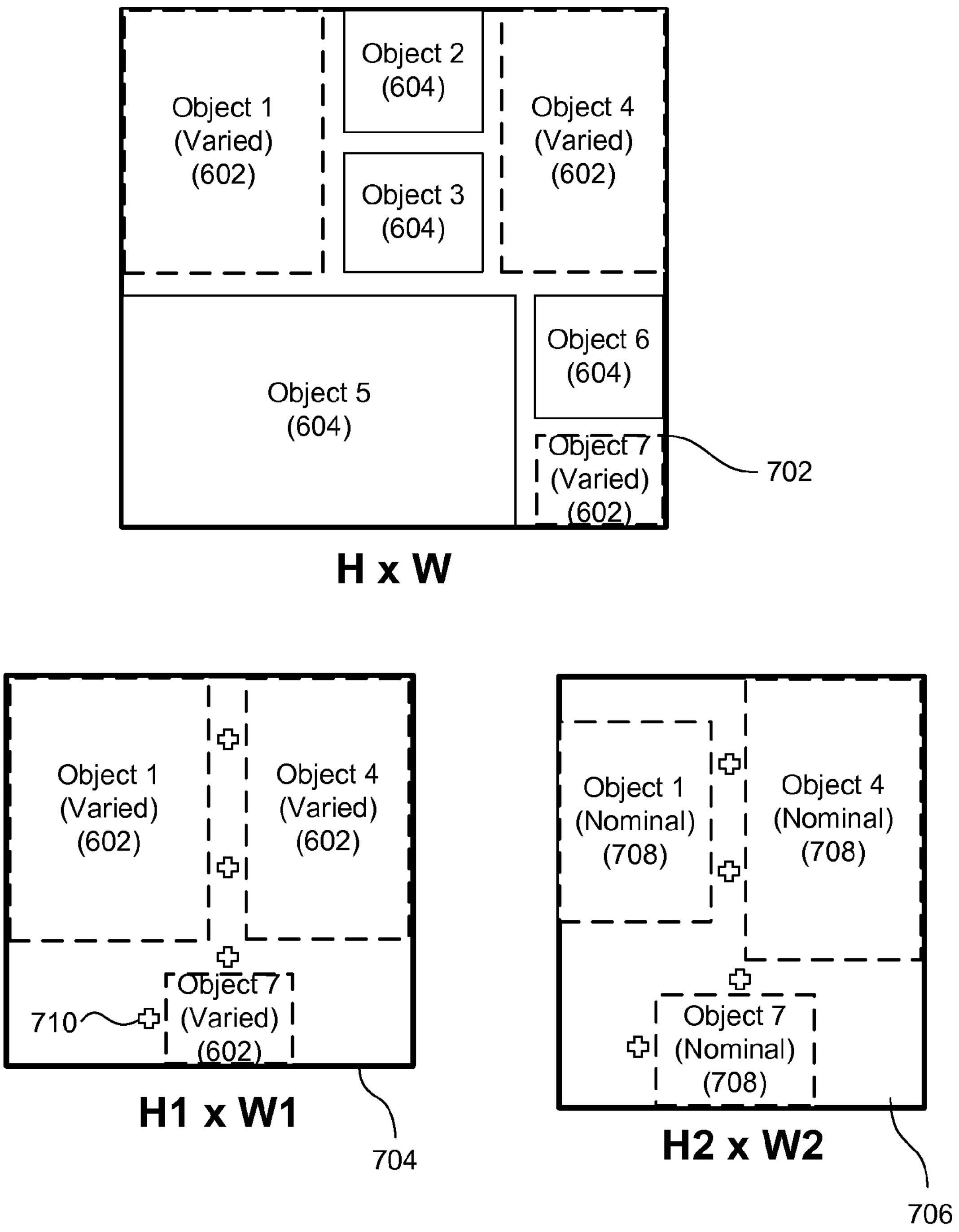
FIG. 7 is a diagram showing an illustrative process of determining the principal bounding box for a graphic object layout, according to one embodiment of principles described herein.

To compute (step 508) the height of the principal bounding box of the final dimensions for all of the graphic objects, the height of the second box is subtracted from the height of the third box. That difference may then be added to the height of the first box. If the sum of the difference plus the height of the first box is greater than the height of the available space, then the sum may be replaced by the height of the available space. Likewise, to compute (step 508) the width of the principal bounding box for the final dimensions of all graphic objects, the width of the second box is subtracted from the width of the third box. That difference may then be added to the width of the first box. If the resulting sum is greater than the width of the available space, then the sum may be replaced by the width of the available space. An example of this process is depicted in FIG. 7 and discussed below.

The above text and accompanying figures are meant to give a description of the processes and steps involved with determining a layout for a number of graphic objects which include both fixed graphic objects and variable graphic objects. The following text and their accompanying figures discuss and illustrate examples and additional aspects of the principles described above.

As mentioned above, in order to compute a score, a final height and width for each graphic object is determined. This process starts by assigning an initial height and width to each graphic object. This may be done by applying an aspect ratio constrained graphic object sizing process with the assumption that each of the fixed graphic objects has variable dimensions.

Figures 6A, 6B:
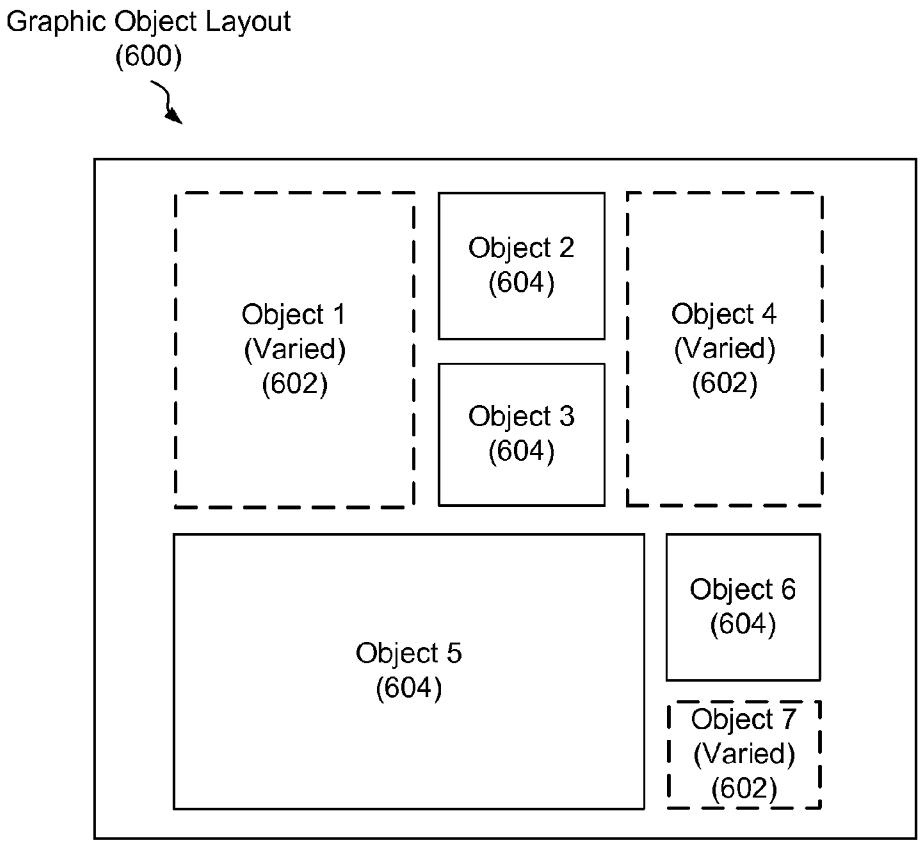
FIG. 6A is a diagram showing an illustrative graphic object layout, according to one embodiment of principles described herein.
FIG. 6B is a diagram showing an illustrative initial layout table for the graphic objects shown in FIG. 6A, according to one embodiment of principles described herein.

FIG. 6A is a diagram showing an illustrative graphic object layout with each graphic object having an initial dimension set. According to one illustrative embodiment, a binary tree may represent a layout (600) having fixed graphic objects (602) and variable graphic objects (604). The aspect ratio constrained graphic object sizing process may be applied to assign an initial area to each graphic object (604, 606) by temporarily regarding all graphic objects as having fixed aspect ratio but variable area. Here, 'temporarily' means only during the application of the aspect ratio constrained graphic object sizing process. After the initial dimensions have been determined, fixed graphic objects are no longer regarded as having variable area.

The initial dimensions for each graphic object in a graphic object layout (600) may include a number of fixed graphic objects (602) with varied dimensions and a number of variable graphic objects (604) with their initial dimensions. In FIG. 6, Object 1, Object 4, and Object 7 are fixed graphic objects which have been assigned an initial dimension set. Each of the fixed graphic objects is represented by dotted lines. Object 2, Object 3, Object 5, and Object 6 are variable graphic objects. Each of the variable graphic objects is represented by solid lines.

As mentioned above, the initially assigned heights and widths for each graphic object may be placed into a layout table (606). FIG. 6B is a diagram showing an illustrative layout table (606) for the graphic objects shown in FIG. 6A. According to one illustrative embodiment, a layout table (606) may include height data (610) and width data (612) for each graphic object (608).

The object column (608) may list each graphic object in the layout. Associated with each graphic object may be a height in the height column (610) and a width in the width column (612). Each graphic object may have an initial height and an initial width which have been assigned by an aspect ratio constrained graphic object sizing process. The fixed graphic objects will generally not have acceptable nominal dimensions. Instead, they will have temporary dimensions as determined by the aspect ratio constrained graphic object sizing process which was applied assuming that the fixed graphic objects had variable dimensions.

As mentioned above, after the initial dimensions for each graphic object have been assigned, and after final dimensions for fixed graphic objects have been selected, a principal bounding box for the final dimensions of the graphic objects may be determined.

FIG. 7 is a diagram showing an illustrative process of determining the principal bounding box for a final graphic object layout. According to one illustrative embodiment, a first box (702) which is the outermost box containing each of the graphic objects (602, 604) having dimensions determined by a aspect ratio constrained graphic object sizing process when assuming that the fixed graphic objects have variable dimensions. The height and of the first box (702) may be designated as H and the width of the first box (702) may be designated as W.

The second box (704) is the outermost box of a temporary layout containing only the fixed graphic objects (602) with their initial dimensions assigned by the aspect ratio constrained graphic object sizing process. Between each of the fixed graphic objects (602), the spacing and border requirements for graphic objects within the layout may still be present. However, the area of each of the variable graphic objects may be temporarily set to zero. In FIG. 7, spacers (710) are shown between the fixed graphic objects which represent the spacing and border space of the variable graphic objects which temporarily have areas of zero. The height of the second box (704) may be designated H1 and the width of the second box (704) may be designated as W1.

The third box (706) is similar to the second box (704). The difference is that the fixed graphic objects (708) assume their final dimensions instead of the initial dimensions assigned by the aspect ratio constrained graphic object sizing process. As mentioned above if the nominal dimensions associated with a fixed graphic object are characterized by a range of nominal dimensions, the nominal dimensions that are closest to the initial dimensions may then be assumed. The height of the third box (706) may be designated as H2 and the width of the third box (706) may be designated as W2.

To compute the height of the principal bounding box of the final dimensions for all of the graphic objects, the height of the second box is subtracted from the height of the third box. That difference may then be added to the height of the first box. The equation for this computation may be represented as $H'=H+H2-H3$, in which H' is the target height of the principal bounding box. Likewise, to compute the width of the principal bounding box for the final dimensions of all graphic objects, the width of the second box is subtracted from the width of the third box. That difference may then be added to the width of the first box. The equation for this computation may be represented as $W'=W+W2-W3$, in which W' is the target width of the principal bounding box.

Figure 8:
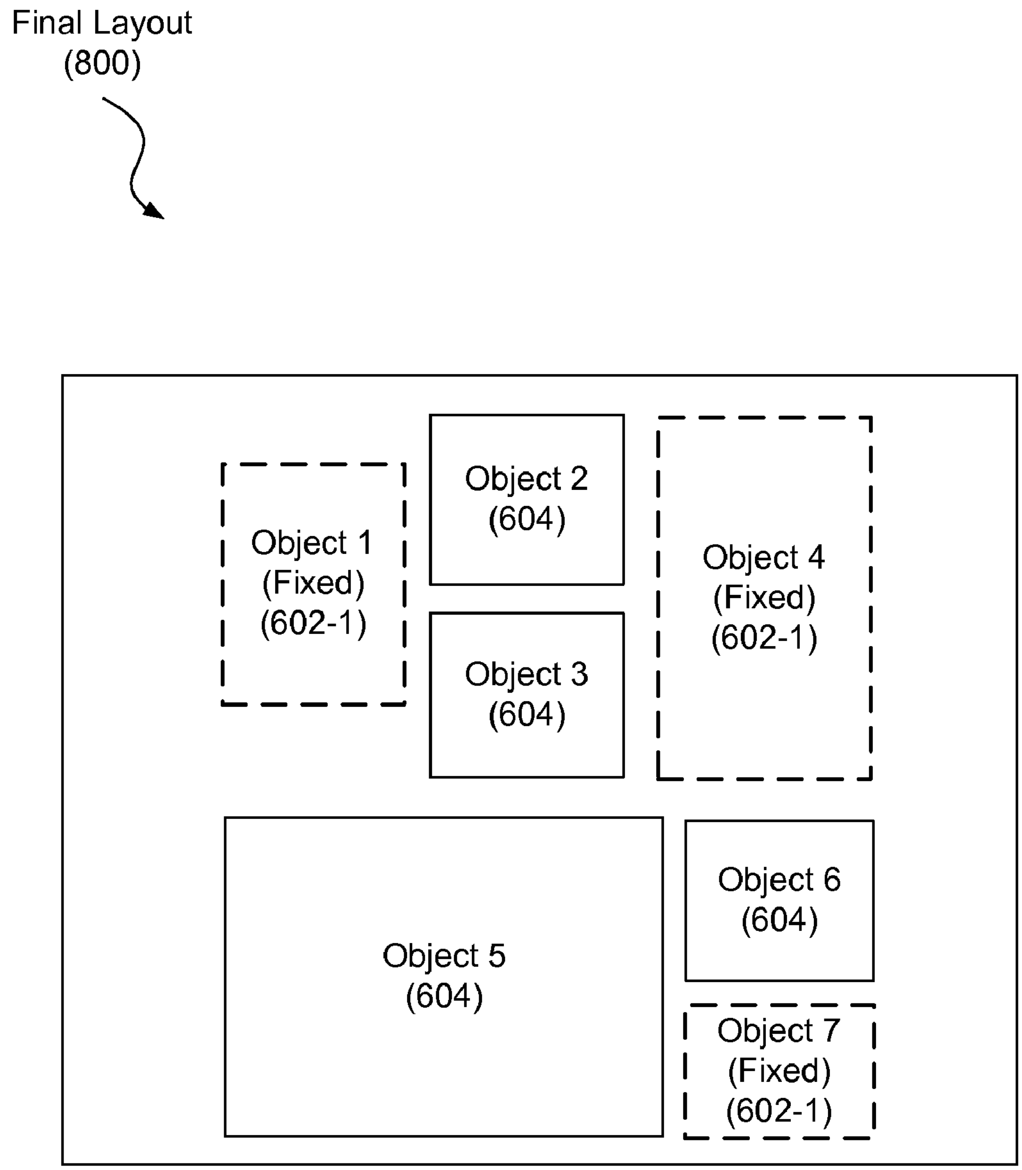
FIG. 8 is a diagram showing an illustrative layout including the final height and width of the graphic object areas, according to one embodiment of principles described herein.

FIG. 8 is a diagram showing an illustrative final layout (800) including the final height and width of the graphic object areas. The final layout (800) may include fixed graphic objects (602-1) having their final dimensions. The final layout may also include the variable graphic objects (604-1) having their final dimensions as determined by solving two system of linear equations. As mentioned above, in one embodiment, the variable objects may be adjusted to fit with the fixed graphic objects so that both sides of a division have a similar total length. This may be the case if the variables represent the heights of the variable graphic objects, and the division in question is a vertical division, or if the variables represent the widths of the variable graphic objects, and the division in question is a horizontal division. For example, graphic objects 1 through 4 are all on one side of a horizontal division. Graphic objects 5 through 7 are all a different side of the horizontal division. The combined widths and spacing on each side of the horizontal division are equal. Similarly Objects 2 and 3 have a total combined height and spacing as Object 4 which is on the other side of a vertical division.

Having this kind of balance between graphic objects on each side of a division may provide a better aesthetic appeal to the overall layout of graphic objects on a page. Also as mentioned above, in one embodiment, the variable objects may be adjusted such that ratios of dimensions of variable graphic objects on either side of a division are preserved when compared to analogous ratios in the layout of initial graphic object dimensions. For example, objects 2 and 3 are on opposite sides of a horizontal division. In the layout of initial graphic object dimensions these two objects have the same height; and in the adjusted layout they still have equal heights, even though the initial and final heights of object 2 may be different, and the initial and final heights of object 3 may be different. Preserving ratios of object sizes may better preserve the visual appearance of the initial layout from the aspect ratio preserving graphic object sizing process.

FIG. 9 is a diagram of an illustrative layout table maintaining a record of relevant spacing and distance information for a graphic object layout. The table has one row for each node in the binary tree representing the candidate layout. According to one illustrative embodiment, a constraint table (900) may include a node column (902), a vertical path column (904), a vertical spacing column (906), a vertical variable distance column (908), and a vertical fixed distance column (910). The constraint table may also include a horizontal path column (912), a horizontal spacing column (914), a horizontal variable distance column (916) and a horizontal fixed distance column (918).

The node column (902) represents each node in the binary tree representing a particular layout. The constraint table in FIG. 9 represents the layout shown in FIG. 6A. Nodes 1-7 are the terminal nodes representing the graphic objects in the layout. These rows may be filled in using the initial dimensions of variable objects, and the final dimensions of fixed objects, as described below. Nodes A-F represent interior nodes which represent divisions in the layout. Due to space constraints, the example data for the interior nodes is not shown. The method for determining the remaining data for the interior nodes will be discussed in detail below in correlation with FIG. 10.

For a given row, the entry in the vertical path column (904) represents a sequence of graphic objects down a vertical path through the bounding box associated with the node associated with the row. In the case of the terminal nodes, the vertical path is only through the graphic object being represented. In the case of the interior nodes, the vertical path includes all graphic objects along a single vertical path through the region associated with the interior node. Generally such a path may or may not include graphic objects associated with all terminal nodes descended from that interior node. The vertical spacing column (906) represents the spacing requirements through the vertical path. For a single graphic object, the spacing requirement may be twice the border thickness (designated in FIG. 9 as "2b"). In the case of the interior nodes, the vertical spacing may depend on the number of graphic objects along the vertical path. For example, if the node is a horizontal division and there is only one graphic object above and only one graphic object below, the vertical spacing requirement for that node may be four times the border space plus the spacing between adjacent graphic object borders. Denoting the required spacing between adjacent graphic object borders as s, the vertical spacing for this node would be (4b+s).

The vertical variable space along a path represents the subset of the path covered by variable graphic objects. Accordingly the vertical variable spacing column (908) determines the sum of the initial heights of any variable graphic objects along the vertical path. In the case of a terminal node, the variable height is zero for fixed graphic objects, and the initial height assigned by an aspect ratio constrained graphic object sizing process for variable graphic objects. In the case of an interior node, the vertical spacing column may contain the sum of initial values of variable graphic objects along the path identified in the vertical path column of the same row.

The vertical fixed column (910) is like the vertical spacing column, but it includes not only the values of borders and spacing along the path identified in the vertical path column of the same row, but also the final heights of any fixed graphic objects along the same path. For a terminal node corresponding to a fixed graphic object, the fixed height is twice the border width plus the final height associated with the fixed graphic object. For a terminal node corresponding to a variable graphic object, the fixed height is simply twice the border width. In the case of an interior node, the vertical fixed column entry is the sum of the vertical spacing entry of the same row, plus the sum of the final heights of the fixed graphic objects along the path identified in the vertical path column of the same row.

The horizontal path column (912), horizontal spacing column (914), horizontal variable distance column (916), and horizontal fixed distance column are similar in respect to their vertical counterparts. The difference is that the horizontal columns deal with horizontal paths and widths relating to each node.

Figure 10:
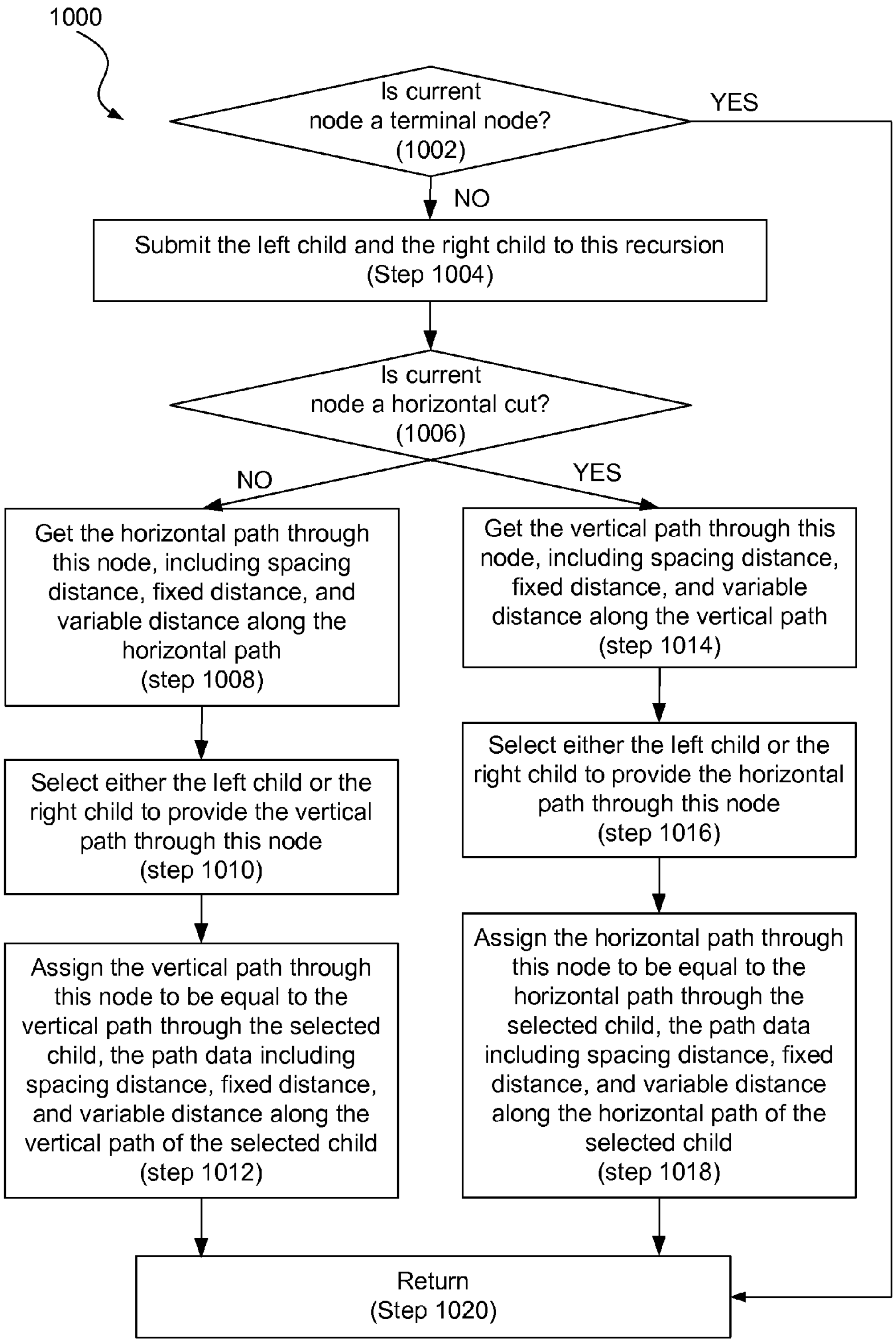
FIG. 10 is a flowchart depicting an illustrative recursive function for obtaining data for the constraint table shown in FIG. 9, according to one embodiment of principles described herein.

FIG. 10 is a flowchart depicting an illustrative recursive function (1000) for filling out the table shown in FIG. 9. According to one illustrative embodiment, the root node of the binary tree may be submitted to a recursive function (1000) to determine the relevant information for the interior nodes A-F of FIG. 9. The information obtained by this recursive function (1000) may then be used to create a solvable system of linear equations according to the constraints set forth above in connection with steps 408 and 410.

The recursive function (1000) may begin by determining (decision 1002) if the current node is a terminal node. If the current node is indeed a terminal node (Decision 1002, YES), then the recursive function (1000) may return. If the current node is not a terminal node (Decision 1002, NO), then the recursive function (1000) may continue to the next step.

Both the left child and the right child of the current node may then be submitted (step 1004) to the recursion function (1000) one at a time. A recursive function is one which calls an instance of itself. A recursive function must have a stopping criterion to prevent perpetual calling of the function. The decision (1002) above in connection with the fact that the binary tree has finite depth serves as such a criterion. This means that process control will eventually return from the recursive function call corresponding to step 1004.

The recursive function (1000) may then determine (decision 1006) if the current node corresponds to a horizontal cut. If the current node does indeed correspond to a horizontal cut (decision 1006, YES), then the recursive function (1000) may continue to step 1014. If the current node does not correspond to a horizontal cut (decision 1006, NO), then the current node corresponds to a vertical cut and the recursive function (1000) may continue to step 1008.

Following the path taken for a vertical cut, the recursive function (1000) may be configured to get (step 1008) the horizontal path through the current node. The recursive function (1000) may retrieve the nodes in the horizontal path, which includes the nodes in the horizontal path of the left child, and the nodes in the horizontal path of the right child. The recursive function (1000) may further retrieve the total spacing distance along the horizontal path. This includes spacing from the horizontal path of the left child, the spacing from the horizontal path of the right child and the spacing between the left child and the right child. The recursive function (1000) will further retrieve the total variable distance of the horizontal path which includes the initial widths of the variable graphic objects from both the left child and the right child. The recursive function (1000) may further retrieve the total fixed distance along the horizontal path which includes the sum of the total spacing distance along the horizontal path, plus the final width of any fixed graphic objects from both the left child node and the right child node. All the information needed may be obtained from data that is already present in the table described in FIG. 9.

It may be the case that there are multiple vertical paths through a node corresponding to a vertical division. There may be one associated with the left child node, and another associated with the right child node. The recursive function (1000) may be configured to select (step 1010) either the left child node or the right child node to provide the designated vertical path through the current node. It is important that an appropriate path through each interior node is chosen, as the path chosen will determine the equations within the system of linear equations. It is important that within the system of linear equations, each equation is linearly independent from the other equations. As will be appreciated by those skilled in the art, this property is necessary in order to have a solvable system of linear equations.

To select an appropriate child node as the designated path through the current node, the recursive function (1000) may first check to see if both the left vertical path and the right vertical path have a positive variable distance. If both child nodes have a positive variable distance, the child node with the smallest variable distance may be selected. If both child nodes have a variable distance of zero, the child node with the greater fixed distance may be selected. If only one of the child nodes has a variable distance of zero, that child node may be selected.

Once the appropriate child node has been selected, the properties of the selected child node may be assigned (step 1012) to the current node. For example, if the left child node is selected, the current node will have designated as its vertical path, the path nodes, the vertical spacing distance, the vertical fixed distance and the vertical variable distance associated with the left child node. The function may then return (step 1020) from the recursive function (1000).

If it is determined that the current node is a horizontal cut (decision 1006, YES), then steps 1014, 1016, and 1018 will be executed. These steps are similar to steps 1008, 1010, and 1012. The only difference is that the terms vertical and horizontal are reversed.

Figure 11:
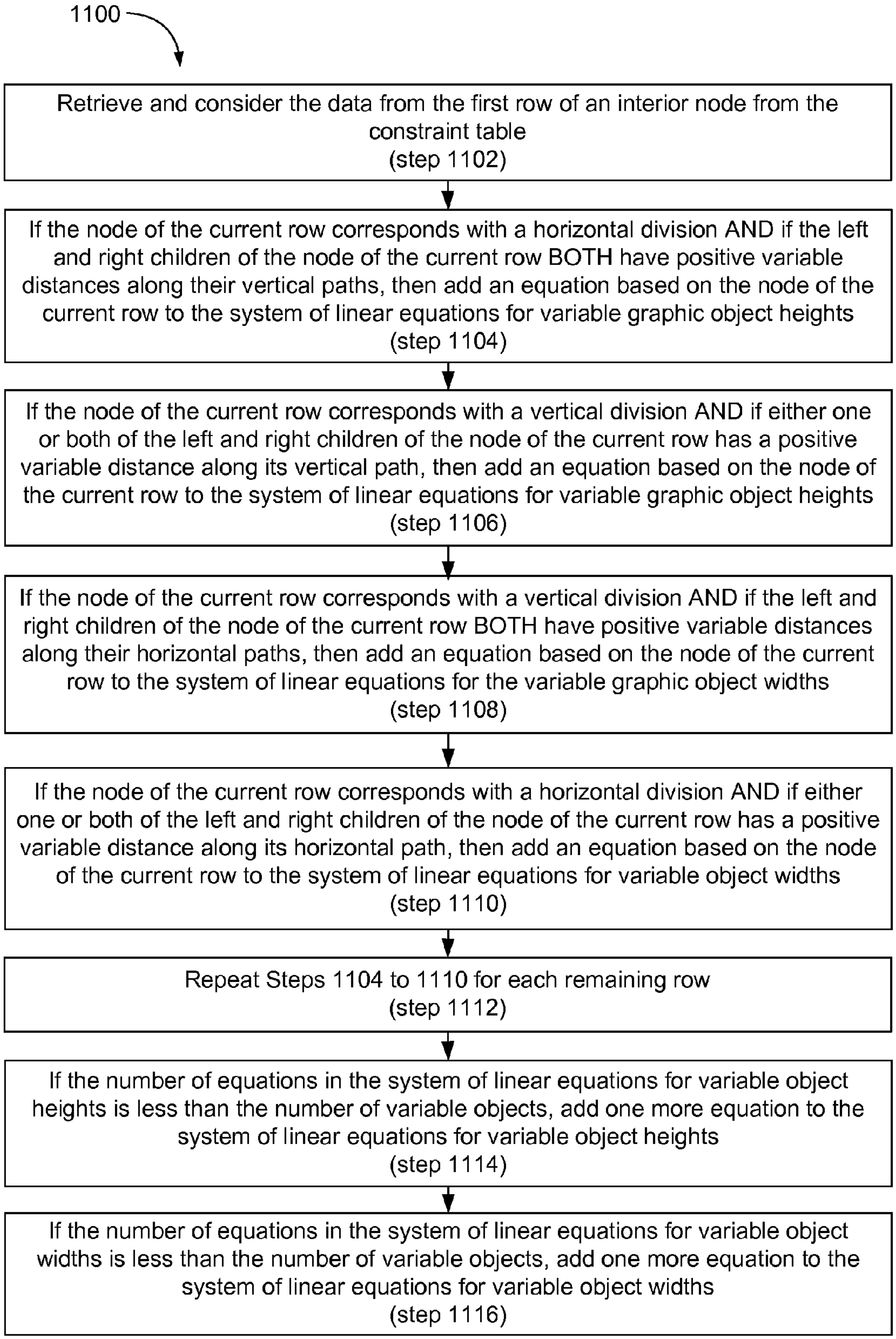
FIG. 11 is a flowchart depicting an illustrative method for using the data from the constraint table shown in FIG. 9 and creating a system of linear equations from the data, according to one embodiment of principles described herein.

FIG. 11 is a flowchart depicting an illustrative method (1100) for using the data from the constraint table shown in FIG. 9 and creating a system of linear equations from the data. According to one illustrative embodiment, two systems of linear equations may be created. One system of linear equations may correspond to the heights of the graphic objects within a layout. The other system of linear equations may correspond to the widths of the graphic objects within a layout. In general a system of linear equations will have a number of equations equal to the number of variable graphic objects. In the example layout shown in FIG. 6A, there are four variable graphic objects. A system of linear equations for this layout would include four equations with four unknown variables. Each of the unknown variables corresponds to a dimension of each of the variable graphic objects within the layout.

The method (1100) begins by retrieving and considering (step 1102) the data from a row of an interior node. As will be described presently, in processing the data of a node, the data from the two nodes that are children of the node is used. In the foregoing description of steps 1104 to 1110, the term "current node" refers to the node of the row currently being considered. The term "left child" refers to the node that is the left child node of the node of the row currently being considered, and likewise for the term "right child". Upon finishing processing the data from a row, the method (1100) may move on to the next row of an interior node and steps 1104 to 1110 are repeated (step 1112). This repetition may continue until each row representing an interior node has been processed.

For one system of linear equations, the heights of each graphic object are considered. If the current node corresponds with a horizontal division AND if the left and right children BOTH have positive vertical variable distances, then an equation based on the current node is added (step 1104) to the system of linear equations for variable graphic object heights. In certain embodiments the equation is as follows:

$$hL\text{ variable}*(hR1+\ldots+hRP)=hR\_\text{variable}*(hL1+\ldots+hLQ) \quad \text{Equation (1)}$$

in which hR1 through hRP are the variables for the final heights of the variable graphic objects in the right child vertical path; hR_variable is the right child vertical variable distance; hL1 through hLQ are the variables for the final heights of the variable graphic objects in the left child vertical path; and hL_variable is the left child vertical variable distance.

If the current node corresponds with a vertical division AND if either one or both of the left and right children has a positive vertical variable distance, then an equation based on the current node is added (step 1106) to the system of linear equations for variable graphic object heights. In certain embodiments the equation is as follows:

$$hR1+\ldots+hRP+hR\_\text{fixed}=hL1+\ldots+hLQ+hL\_\text{fixed} \quad \text{Equation (2)}$$

in which hR1 through hRP are the variables for the final heights of the variable graphic objects in the right child vertical path; hR_fixed is the right child vertical fixed distance; hL1 through hLQ are the variables for the final heights of the variable graphic objects in the left child vertical path; and hL_fixed is the left child vertical fixed distance, If one of the children has no variable graphic objects in its vertical path, then the corresponding side of the equation does not have any variables for final heights of variable graphic objects.

For the other system of linear equations, the widths of each graphic object are considered. If the node of the current row corresponds with a vertical division AND if the left and right children of the node of the current row BOTH have positive variable distances along their horizontal paths, then an equation based on the node of the current row is added (step 1108) to the system of linear equations for the variable graphic object widths. In certain embodiments the equation is as follows:

$$wL\_\text{variable}*(wR1+\ldots+wRP)=wR\_\text{variable}*(wL1+\ldots+wLQ) \quad \text{Equation (3)}$$

in which wR1 through wRP are the variables for the final widths of the variable graphic objects in the right child horizontal path; wR_variable is the right child horizontal variable distance; wL1 through wLQ are the variables for the final widths of the variable graphic objects in the left child horizontal path; and wL_variable is the left child horizontal variable distance.

If the current node corresponds with a horizontal division AND if either one or both of the left and right children has a positive horizontal variable distance, then an equation is added (step 1110) based on the current node to the system of linear equations for variable object widths. In one embodiment the equation is as follows:

$$wR1+\ldots+wRP+wR\_\text{fixed}=wL1+\ldots+wLQ+wL\_\text{fixed} \quad \text{Equation (4)}$$

in which wR1 through wRP are the variables for the final widths of the variable graphic objects in the right child horizontal path; wR_fixed is the right child horizontal fixed distance; wL1 through wLQ are the variables for the final widths of the variable graphic objects in the left child horizontal path; and wL_fixed is the left child horizontal fixed distance. If one of the children has no variable graphic objects in its horizontal path, then the corresponding side of the equation does not have any variables for final widths of variable graphic objects.

After each row in the table has been processed, the system may be configured to check to see if the number of equations in the system of linear equations for variable object heights is less than the number of variable objects. If so an equation is added (step 1114) to the system of linear equations for variable object heights. This equation sets the length of the root node vertical path equal to a target height for principal bounding box. If the number of equations in the system of linear equations for variable object widths is less than the number of variable objects, an equation is added (step 1116) to the system of linear equations for variable object widths. This equation sets the length of the root node horizontal path equal to the target width of the principal bounding box.

In sum, a method for determining an optimal layout of graphic objects when some of the graphic objects have fixed dimensions and others have variable dimensions is provided. The method includes, receiving a plurality of graphic objects, the plurality of graphic objects including a number of variable graphic objects and a number of fixed graphic objects. The method further includes, for each of the fixed graphic objects, creating a number of discrete dimension sets, generating a number of binary trees with, each of the binary trees representing a unique layout for the plurality of graphic objects in which each of the fixed graphic object exhibits one of the discrete dimension sets, assigning a score to each of the binary trees, and arranging the graphic objects according to the layout represented by a binary tree selected from the number of generated binary trees based on the score.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system for arranging a plurality of graphic objects on a page, the method comprising:

receiving said plurality of graphic objects in said physical computing system, said plurality of graphic objects comprising a number of variable graphic objects and a number of fixed graphic objects;

for each of said fixed graphic objects, creating a number of discrete dimension sets, said fixed graphic objects being treated as having variable dimensions during creation of said discrete dimension sets;

generating a number of binary trees, each of said binary trees representing a unique layout for said plurality of graphic objects in which each of said fixed graphic object exhibits one of said discrete dimension sets;

assigning a score to each of said binary trees; and arranging said graphic objects according to said layout represented by a binary tree selected from said number of generated binary trees based on said score;

wherein the assigning a score to each said binary tree comprises:

assigning an initial height and an initial width to each graphic object in said binary tree, said fixed graphic objects being treated as having variable dimensions during said assignment of said initial height and said initial width;

adjusting the height and width of each graphic object such that the height and width of said fixed graphic objects match their specified dimensions; and computing a numerical score for said binary tree based on the adjusted areas of the graphic objects.

2. The method of claim 1, in which assigning a score to each said binary tree comprises:

assigning an initial height and an initial width to each graphic object in said binary tree, said fixed graphic objects being treated as having variable dimensions during said assignment of said initial height and said initial width;

selecting a final dimension set for each fixed graphic object;

determining a principal bounding box for said graphic objects represented by said binary tree with said graphic layout system;

creating a first system of linear equations for determining a height for each variable graphic object represented by said binary tree, said system of linear equations taking into account said final heights for said fixed graphic objects;

creating a second system of linear equations for determining a width for each variable graphic object represented by said binary tree, said system of linear equations taking into account said final widths for said fixed graphic objects;

solving said first system of linear equations and said second system of linear equations to determine a final height and a final width for each of said variable graphic objects in said layout represented by said binary tree; and computing said score based on said final height and said final width of said graphic objects in said layout represented by said binary tree.

3. The method of claim 2, in which said determining said principal bounding box comprises:

determining a first dimension set of a first box, said first box containing each of said graphic objects represented by said binary tree, each graphic object having said initial height and said initial width;

determining a second dimension set of a second box, said second box containing only said fixed graphic objects each having said initial height and said initial width;

determining a third dimension set of a third box, said third box containing said fixed graphic objects each having said final height and said final width; and computing a target dimension by adding a difference of said third dimension set and said second dimension set to said first dimension set.

4. The method of claim 2, in which each of said final height and said final width falls within a predefined range.

5. The method of claim 2, in which assigning said initial height and said initial width comprises accounting in said initial height and said initial width for at least one of: a border around one of said graphic objects and a minimum spacing between said graphic objects.

6. The method of claim 2, further comprising:

creating a table of fixed distances, variable distances, and spacing distances for each terminal node of each said binary tree;

determining a total length for fixed distances, variable distances, and spacing distances for each interior node of each said binary tree, said total length representing a path traversing said page through said interior node;

in which each said total length and data from each said table are used to formulate at least one of said systems of linear equations; and in which each said path is selected such that said one of said systems of linear equations will be solvable.

7. The method of claim 1, in which said score assigned to each said binary tree is based on a comparison between graphic object areas in said layout represented by said binary tree and at least one criterion selected from the group of: a user preference, an amount of unused space in said layout represented by said binary tree, and a photo area balance in said layout represented by said binary tree.

8. A computing system comprising:

a processor; and a computer memory having graphic layout software stored thereon;

in which, said graphic layout software is configured to cause said processor to, upon execution of said graphic layout software:

receive said plurality of graphic objects, said plurality of graphic objects comprising a number of variable graphic objects and a number of fixed graphic objects;

for each of said fixed graphic objects, create a number of discrete dimension sets, said fixed graphic objects being treated as having variable dimensions during creation of said discrete dimension sets;

generate a number of binary trees, each of said binary trees representing a unique layout for said plurality of graphic objects in which each of said fixed graphic object exhibits one of said discrete dimension sets;

assign a score to each of said binary trees; and arrange said graphic objects according to said layout represented by a binary tree selected from said number of generated binary trees based on said score;

wherein assigning a score to each said binary tree comprises:

assigning an initial height and an initial width to each graphic object in said binary tree, said fixed graphic objects being treated as having variable dimensions during said assignment of said initial height and said initial width;

adjusting the height and width of each graphic object such that the height and width of said fixed graphic objects match their specified dimensions; and computing a numerical score for said binary tree based on the adjusted areas of the graphic objects.

9. The computing system of claim 8, in which to assign said score to each said binary tree, said processor is further configured to:

assign an initial height and an initial width to each graphic object in said binary tree, said fixed graphic objects being treated as having variable dimensions during said assignment of said initial height and said initial width;
select a final dimension set for each fixed graphic object;
determine a principal bounding box for said graphic objects represented by said binary tree with said graphic layout system;
create a first system of linear equations for determining a height for each variable graphic object represented by said binary tree in which said final height for each said fixed graphic object is used;
create a second system of linear equations for determining a width of each variable graphic object represented by said binary tree in which said final width for each said fixed graphic object is used;
solve said first system of linear equations and said second system of linear equations to determine a final height and a final width for each of said graphic objects in said layout represented by said binary tree; and
compute said score based on said final height and said final width of said graphic objects in said layout represented by said binary tree.

10. The computing system of claim 9, in which to determine said principal bounding box, said processor is further configured to:
determine a first dimension set of a first box, said first box containing each of said graphic objects represented by said binary tree, each graphic object having said initial height and said initial width;
determine a second dimension set of a second box, said second box containing only said fixed graphic objects each having said initial height and said initial width;
determine a third dimension set of a third box, said third box containing said fixed graphic objects each having said final height and said final width; and
compute a target dimension by adding a difference of said third dimension set and said second dimension set to said first dimension set.

11. The computing system of claim 9, in which each of said final height and said final width falls within a predefined range.

12. The computing system of claim 9, in which said processor is further configured to account in said initial height and said initial width for at least one of: a border around one of said graphic objects and a minimum spacing between said graphic objects.

13. The computing system of claim 9, in which said processor is further configured to:
create a table of fixed distances, variable distances, and spacing distances for each terminal node of each said binary tree; and
determine a total length for fixed distances, variable distances, and spacing distances for each interior node of each said binary tree, said total length representing a path traversing said page through said interior node;
in which each said total length and data from each said table are used to formulate at least one of said systems of linear equations; and
in which each said path is selected such that said at least one of said systems of linear equations will be solvable.

14. The computing system of claim 8, in which said score assigned to each said binary tree is based on a comparison between object areas in said layout represented by said binary tree and at least one criterion selected from the group of: a user preference, an amount of unused space in said layout represented by said binary tree, and photo area balance.

15. A method performed by a physical computing system for arranging a plurality of graphic objects on a page, the method comprising:
receiving said plurality of graphic objects as a selection made by a user of said physical computing system, said plurality of graphic objects comprising a number of variable graphic objects and a number of fixed graphic objects;
for each of said fixed graphic objects, creating a number of discrete dimension sets, said fixed graphic objects being treated as having variable dimensions during creation of said discrete dimension sets;
generating a number of binary trees, each of said binary trees representing a unique layout for said plurality of graphic objects in which each of said fixed graphic object exhibits one of said discrete dimension sets;
assigning a score to each of said binary trees;
arranging said graphic objects according to said layout represented by a binary tree selected from said number of generated binary trees based on said score; and
displaying an arrangement of said graphic objects based on said selected binary tree to at least said user;
wherein the assigning a score to each said binary tree comprises:
assigning an initial height and an initial width to each graphic object in said binary tree, said fixed graphic objects being treated as having variable dimensions during said assignment of said initial height and said initial width;
adjusting the height and width of each graphic object such that the height and width of said fixed graphic objects match their specified dimensions; and
computing a numerical score for said binary tree based on the adjusted areas of the graphic objects.

16. The method of claim 15, in which assigning a score to each said binary tree comprises:
assigning an initial height and an initial width to each graphic object in said binary tree using said discrete dimension sets for said fixed graphic objects;
selecting a final dimension set for each fixed graphic object;
determining a principal bounding box for said graphic objects represented by said binary tree with said graphic layout system;
creating a first system of linear equations for determining a height for each variable graphic object represented by said binary tree, said system of linear equations taking into account said final heights for said fixed graphic objects;
creating a second system of linear equations for determining a width for each variable graphic object represented by said binary tree, said system of linear equations taking into account said final widths for said fixed graphic objects;
solving said first system of linear equations and said second system of linear equations to determine a final height and a final width for each of said variable graphic objects in said layout represented by said binary tree; and
computing said score based on said final height and said final width of said graphic objects in said layout represented by said binary tree.

17. The method of claim 16, in which said determining said principal bounding box comprises:
determining a first dimension set of a first box, said first box containing each of said graphic objects represented by said binary tree, each graphic object having said initial height and said initial width;

determining a second dimension set of a second box, said second box containing only said fixed graphic objects each having said initial height and said initial width;

determining a third dimension set of a third box, said third box containing said fixed graphic objects each having said final height and said final width; and computing a target dimension by adding a difference of said third dimension set and said second dimension set to said first dimension set.

18. The method of claim 16, in which each of said final height and said final width falls within a predefined range.

19. The method of claim 16, in which assigning said initial height and said initial width comprises accounting in said initial height and said initial width for at least one of: a border around one of said graphic objects and a minimum spacing between said graphic objects.

20. The method of claim 16, further comprising:

creating a table of fixed distances, variable distances, and spacing distances for each terminal node of each said binary tree;

determining a total length for fixed distances, variable distances, and spacing distances for each interior node of each said binary tree, said total length representing a path traversing said page through said interior node;

in which each said total length and data from each said table are used to formulate at least one of said systems of linear equations; and in which each said path is selected such that said one of said systems of linear equations will be solvable.

* * * * *